(12) United States Patent
Seki et al.

(10) Patent No.: US 8,521,605 B2
(45) Date of Patent: Aug. 27, 2013

(54) SERVER, INFORMATION COMMUNICATION TERMINAL, PRODUCT SALE MANAGEMENT METHOD, AND STORAGE MEDIUM AND PROGRAM TRANSMISSION APPARATUS THEREFOR

(75) Inventors: Naishin Seki, Yokohama (JP); Hideki Tai, Yamato (JP)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 544 days.

(21) Appl. No.: 12/540,818

(22) Filed: Aug. 13, 2009

(65) Prior Publication Data

US 2009/0299873 A1 Dec. 3, 2009

Related U.S. Application Data

(62) Division of application No. 09/863,735, filed on May 23, 2001, now abandoned.

(30) Foreign Application Priority Data

May 25, 2000 (JP) ................................ 2000-155357

(51) Int. Cl.
*G06Q 30/00* (2012.01)
(52) U.S. Cl.
USPC ........................................................ 705/26.1
(58) Field of Classification Search
IPC ..................................................... G06Q 30/00
See application file for complete search history.

(56) References Cited

U.S. PATENT DOCUMENTS

| 5,710,887 | A  | * | 1/1998 | Chelliah et al. ............ 705/26.62 |
| 6,604,089 | B1 |   | 8/2003 | Van Horn et al. |
| 7,711,604 | B1 |   | 5/2010 | Walker et al. |
| 7,970,713 | B1 |   | 6/2011 | Gorelik et al. |
| 2001/0014868 | A1 | * | 8/2001 | Herz et al. ...................... 705/14 |

OTHER PUBLICATIONS

Office Action for U.S. Appl. No. 12/540,713 dated Dec. 8, 2010.
Final Office Action for U.S. Appl. No. 12/540,713 dated Jun. 23, 2011.
Final Office Action for U.S. Appl. No. 12/540,754 dated Feb. 24, 2012.
Final Office Action for U.S. Appl. No. 12/540,734 dated Feb. 24, 2012.
Final Office Action for U.S. Appl. No. 12/540,856 dated Feb. 24, 2012.
Final Office Action for U.S. Appl. No. 12/540,800 dated Feb. 27, 2012.

* cited by examiner

*Primary Examiner* — Paul Danneman
(74) *Attorney, Agent, or Firm* — F. Chau & Associates, LLC

(57) ABSTRACT

A product retail sales management server for managing the retail sales of a product across a communication network comprises: a retail sales management module for managing the retail sales of the product; a price update module 13 for dynamically setting the price of the product in accordance with rules and the retail sales state of the product and in accordance with the actual retail sales state of the product when managed by the retail sales management module; and an acceptance module 11 for, upon the receipt of an information request via the communication network, furnishing a request transmission source with the information concerning the product and the price of the product, set by the price update module at the time the information request is received.

14 Claims, 13 Drawing Sheets

Initial Setup Table ⟶ 21

| Product ID | 01 | 02 | ... |
|---|---|---|---|
| Dependency element | Retail sales count | Retail sales count ranking | ... |
| Lowest price | 2000 | | ... |
| Highest price | 500 | | ... |
| Monetary unit | | | ... |

FIG. 3

Price Determination Policy Table ⟶ 22

| Product ID | 01 | 02 | 03 |
|---|---|---|---|
| Dependency element | Retail sales count | Ranking | Retail sales frequency |
| Policy | UpCounter_C 20<br>UpRange_C 10<br>TimeLimit_C<br>T(00:00)<br>DownRange 10<br><br>· Raise a price 10 yen after 20 units are sold<br>· Reduce a price 10 yen when no unit is sold for 120 minutes | RankUp_R 1<br>RankDown_R 1<br>UpRange_R 10<br>DownRange_R 10<br><br><br>· Raise a price 10 yen when a rank is incremented by one<br>· Reduce a price 10 yen when a rank is decremented by one | FreqUp_F 10<br>UpRange_F 10<br>FreqDown_F 20<br>DownRange_F 10<br><br><br>· Raise a price 10 yen when a retail sales frequency is increased by 10%<br>· Reduce a price 10 yen when a retail sales frequency is reduced by 10% |

FIG. 4

Current Price Table — 23

| Product ID | 01 | 02 | ... |
|---|---|---|---|
| Price | | | ... |
| Monetary Unit | | | ... |

FIG. 5

Price Trend Table — 24

| Product ID | 01 | 02 | ... |
|---|---|---|---|
| Dependency element | Retail sales count | Retail sales frequency | ... |
| Change condition | Rest_C  5<br>LastAccess_C<br>T(00:00) | Freq_C  5<br><br>Price change time<br>Next_T 12:59PM | ... |

FIG. 6

Retail Sales History Table — 25

| Product ID = 01 ||| Product ID = 02 ||| ... |
|---|---|---|---|---|---|---|
| Retail time | Retail price | User ID | Retail time | Retail price | User ID | |
| 11:03<br>13:42<br>: | 1000<br>1000<br>: | | | | | ... |
| Total of units sold ||| Total of units sold ||| |

FIG. 7

Retail sales history table — 25
- Product ID: 01
- PurchaseTime: T(11:00)
- PurchasePrice: 1000

Price trend table — 24
- Product ID: 01
- Rest_C: 19

FIG. 15

Retail sales history table — 25
- Product ID: 01
- PurchaseTime: T(11:30)
- PurchasePrice: 1000

Current price table — 23
- Product ID: 01
- Price: 1010

Price trend table — 24
- Product ID: 01
- Rest_C: 20

FIG. 16

Retail sales history table — 25
- Product ID: 01
- PurchaseTime: T(11:00)
- PurchasePrice: 1000

Price trend table — 24
- Product ID: 01
- Rest_C: 19
- LastAccess_C: T(11:00)

FIG. 18

Current price table — 23
- Product ID: 01
- Price: 990

Price trend table — 24
- Product ID: 01
- Rest_C: 20
- LastAccess_C: T(13:00)

FIG. 19

SERVER, INFORMATION COMMUNICATION TERMINAL, PRODUCT SALE MANAGEMENT METHOD, AND STORAGE MEDIUM AND PROGRAM TRANSMISSION APPARATUS THEREFOR

CROSS REFERENCE TO RELATED APPLICATIONS

This application is a Divisional Application of U.S. application Ser. No. 09/863,735, filed on May 23, 2001, which claims priority to Japanese Patent Application Number 2000-155357, filed May 25, 2000, the disclosures of which are herein incorporated by reference in their entirety.

BACKGROUND OF THE INVENTION

1. Field of the Invention

The present invention relates to a retail sales management system for use when products are sold via a communication network.

2. Discussion of Related Art

Electronic commerce, involving the retail sales of products and the contracting out of services using communication networks, such as the Internet, has become a popular and wide spread addition to the retail sales business field. An intending purchaser, when availing himself or herself of the conveniences afforded by electronic commerce, generally selects a desired product, or a service, by referring to products for sale, or services to be provided, that are listed on a computer screen, enters his or her name, address and telephone number, along with a payment method, and transmits these data to a retailer. This is all that is required of the purchaser; all other procedures associated with a purchase are handled by the retailer.

The price for a product or the charge for a service is generally set by a retailer. At this time, the retail price is normally determined by adding a profit margin to the actual expenses involved in the manufacture of a product, or in the provision of a service. Further, when determining a price, the popularity a product enjoys among users, and user product evaluations may be taken into account.

There are retailing methods, such as auction sales, where buyers take the initiative in setting prices. In such a case, however, since the buyers compete with each other and bid up the price of a product, the final price paid may far exceed that which most consumers would regard as appropriate. And since an auction sale is more appropriate when the number of intending purchasers exceeds the available supply of a product, it is not suitable for general trading.

According to one method whereby the retail price of a product is dynamically established, for a product such as a computer program, the employment frequency (the number of activations, or the employment period) is recorded and measured, and when a predetermined value is reached, the payment of a charge is requested. According to another method, when a specific time has elapsed following the start of a sale, the retail prices of some subject products are reduced. However, these retailing methods do not immediately and directly reflect an evaluation such as is acquired when a product has been tested on the market and has been compared with other, similar products. During the exchange of data across a communication network, user evaluations of content to be provided may be fed back to an intending purchaser. For example, the number of times the content was accessed, or a user evaluation may be supplied as a reference item to facilitate the selection of content. Or, the content may be ranked in accordance with its evaluation or employment frequency, and thereafter presented to an intending purchaser.

However, content evaluation is merely provided as reference matter to be considered when a choice is made, and is not used as a basis for the setting of a price for a product (content).

As is described above, according to the conventional retail sales method, when a retailer sets a price for a product or a charge for a service, a value attributable the popularity of the product or the service with users, and how they evaluate it may be added to the price. However, when the popularity of a product or service or the user evaluation of it fluctuates over time, a great deal of labor must be devoted to immediately, and frequently, changing the retail price to reflect marketing realities.

However, if a price is set each time there is a variation in the popularity or in the user evaluation of a product or service, a lower price can be set for an unpopular product or service to increase its marketing competitiveness, or a higher price can be set for a popular product or service to increase the net profit.

Further, conventionally, when a retailer sets a retail price while taking into account the popularity or the evaluation of a product or a service, only the current popularity or evaluation are taken into consideration when the price is selected. However, if along with an altered retail price information were provided concerning trends affecting price changes (e.g., how the price will subsequently be changed), such information would assist auser in appropriately timing the purchase of a product or the selection of a service.

As is described above, according to the conventional method for dynamically setting the retail price of a product, the price of a frequently employed product is increased and the price of a less frequently employed product is reduced. But the conventional method can not flexibly assign a new retail price consonant with a change in the popularity or in the overall user evaluation of a product or a service.

It is, therefore, one object of the present invention to provide a retail sales management system that, consonant with the level of popularity or the user evaluation of a product or service, dynamically sets a retail price for a product or a charge for a service.

SUMMARY OF THE INVENTION

To achieve the above object, according to the present invention, a server for managing the retail sales of a product across a communication network comprises: retail sales state management means for managing the retail sales state of the product; price setting means for dynamically setting the price of the product in accordance with rules and the retail sales state of the product and in accordance with the actual retail sales status of the product when managed by the retail sales state management means; and product information provision means for, upon the receipt of an information request via the communication network, furnishing a request transmission source with the information concerning the product and the price of the product, set by the price setting means at the time the information request is received.

According to the present invention, a product is any item targeted for business trading (sales) across a communication network. Therefore, in addition to prices for general goods and digital content, the present invention can be applied for the dynamical setting of a charge for a service.

Further, according to the present invention, a server may also be provided that does not include the product information provision means and that dynamically sets retail prices consonant with the actual retail sales states of products.

The server further comprises: price trend information provision means for generating, in accordance with the actual retail sales state of the product, information concerning trends affecting the changes of the price of the product, and for furnishing the information to the information request transmission source.

This configuration is preferable because an intending purchaser of a product can refer to the information concerning trends affecting the changes of the price of the subject product, and can acquire an appropriate timing for the purchase of the product.

The information concerning the trends affecting the changes of the price of the product can be arbitrarily set, using content based on the number of products sold, such as "how much the price will be increased after how many more products are sold", content based on a time element, such as "how much the price will be reduced at what time", or content based on a rank provided in accordance with the popularity or the user evaluation of a product, such as "how much the price will be increased (or reduced) when the rank is incremented (decremented) by one".

Specifically, a method for setting a price in accordance with the number of products sold can be employed to increase the profit provided by a product that is selling well and for providing a competitive price provided by a product that is not selling well. For example, the price setting means can set a price for the product by using rules, based on the retail sales state of the product, according to which the price is increased as the number of product units sold rises or decreased as the number of product units sold falls.

Furthermore, according to the present invention, a server for charging for and providing digital content via a communication network comprises: sales state management means, for managing the sales state of the digital content; price setting means, for dynamically changing a charge for accessing the digital content in accordance with rules and the sales state of the digital content and in accordance with the sales state of the digital content, which is managed by the sales state management means; and information provision means for presenting to an information request transmission source, upon the receipt of an information request via the communication network, information concerning the digital content and the charge for accessing the digital content that is set by the price setting means at the time the information request is received.

A server can be provided that does not include the information provision means and that dynamically sets the access charge in accordance with the actual sales state of the digital content.

The server further comprises: price trend information provision means, for generating, in accordance with the sales state of the digital content, information concerning trends affecting the changing of the charge for accessing the digital content and for furnishing the information to the information request transmission source.

This configuration is preferable because a user who accesses and downloads the digital content can refer to the information concerning the trends affecting the price of the subject product, and can acquire an appropriate timing for accessing the digital content.

As well as for a general product, information concerning trends associated with the changing of an access charge, such as the contents based on an access count, the contents based on a time element, or the contents based on a rank awarded in accordance with the popularity or the user evaluation of a product, can be arbitrarily set.

The price setting means sets the charge for accessing the digital content in accordance with rules and the sales state of the digital content and according to which the charge for an access is increased when the number of accesses of the digital content rises or is reduced when the number of accesses falls. The price setting means sets the charge for accessing the digital content in accordance with rules, which is based on the sales state of the digital content, according to which the charge for an access is increased when the rank awarded the digital content, which is consonant with the popularity or the evaluation of the digital content, is incremented, or the charge for an access is reduced when the rank awarded the digital content is decremented.

According to the present invention, an information communication terminal is provided, for accessing a product retail sales management server across a communication network and for purchasing a product offered by the server, whereby an information request is issued to the server in order to obtain information concerning the product and the price of the product; whereby the information concerning the product and the price of the product, and information concerning trends affecting the changes of the price are received after the server has accepted the information request; and whereby, when a user has examined the information, as needed, and has determined to purchase the product, a purchase request to that effect is transmitted to the server.

Further, according to the present invention, a product retail sales management method, for managing the retail sales of a product in accordance with a purchase request that is issued, via a communication network, by a server connected thereto, comprises the steps of: managing the retail sales state of the product; dynamically setting the price of the product in accordance with rules and the retail sales state of the product and in accordance with the actual retail sales status of the product; and furnishing information concerning the product upon the receipt of an information request via the communication network, and furnishing the price set for the product at the time the information request is accepted.

The product retail sales management method further comprises, after the step of furnishing the price of the product, a step of accepting a purchase request for the product that is issued after the information concerning the product and the price of the product have been provided.

The product retail sales management method of the invention further comprises the steps of: generating, upon receipt of the information request, information concerning trends affecting the changes of the price of the product in accordance with the retail sales state of the product. At the step of furnishing the information concerning the product and the price of the product, the information concerning the trends affecting the changes of the price of the product can also be furnished.

According to the present invention, a storage medium can be provided on which reading means of a computer stores a computer-readable program that permits the computer to perform the processes that correspond to the steps of the product retail sales management method.

In addition, a program transmission apparatus can be provided that comprises: storage means for storing the program; and transmission means for reading, from the storage means, and transmitting the program.

This configuration is preferable because a computer that executes the program can perform product retail sales management, including dynamically setting the price of a product in accordance with its retail sales state of the product.

BRIEF DESCRIPTION OF THE DRAWINGS

FIG. 3 is a diagram showing an example structure for an initial setup table used for the embodiment.

FIG. 4 is a diagram showing an example structure for a price determination policy table used for the embodiment.

FIG. 5 is a diagram showing an example structure for a current price table used for the embodiment.

FIG. 6 is a diagram showing an example structure for a price trend table used for the embodiment.

FIG. 7 is a diagram showing an example structure for a retail sales history table used for the embodiment.

FIG. 15 is a diagram showing tables in which the states of the contents in FIG. 14 have been changed.

FIG. 16 is a diagram showing tables in which the states of the contents in FIGS. 14 and 15 have been changed.

FIG. 18 is a diagram showing tables in which the states of the contents in FIG. 17 have been changed.

FIG. 19 is a diagram showing tables in which the states of the contents in FIGS. 17 and 18 have been changed.

DETAILED DESCRIPTION OF PREFERRED EMBODIMENTS

Preferred embodiments of the present invention will now be described in detail while referring to the accompanying drawings.

Figure 1:
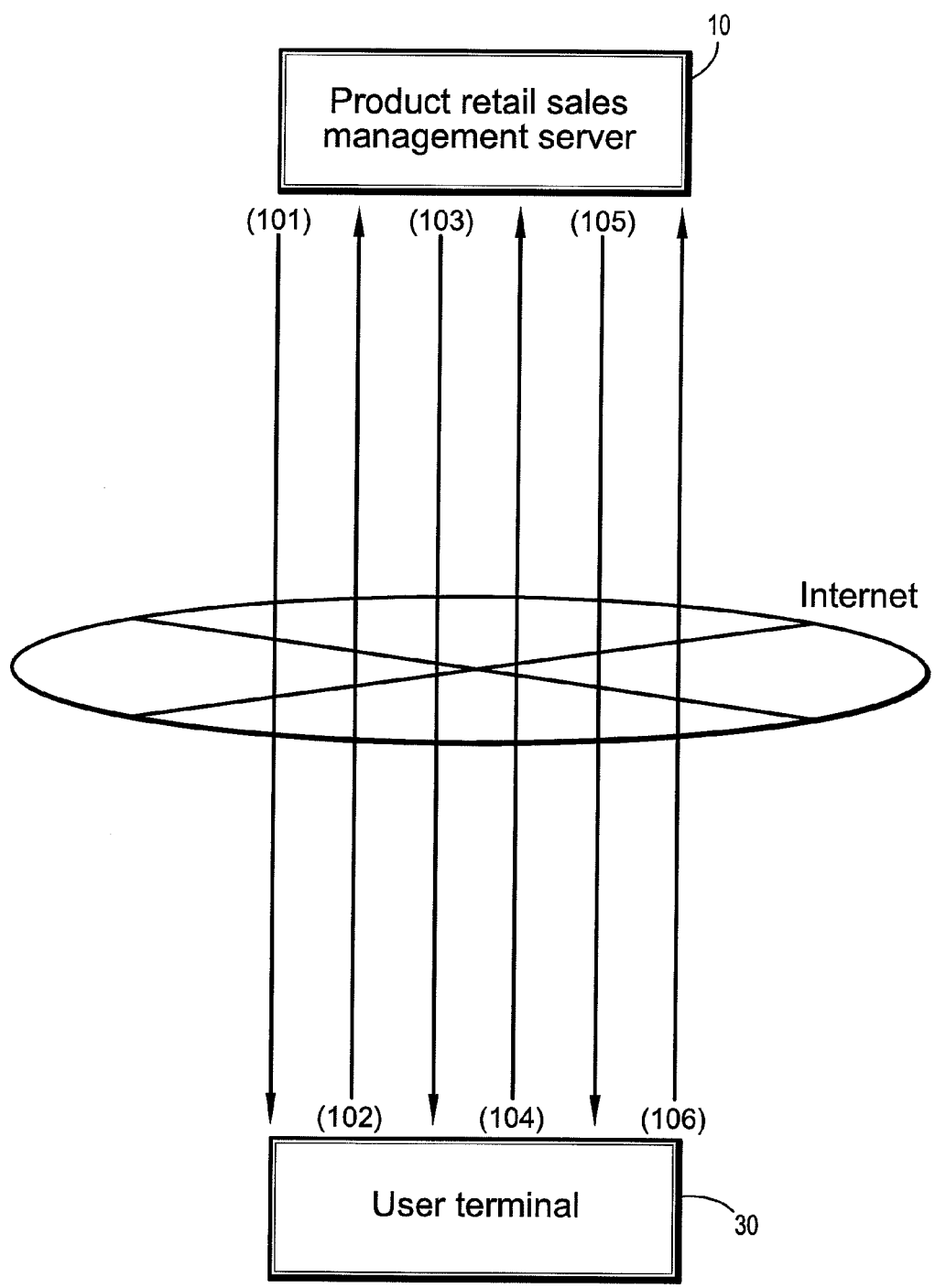
FIG. 1 is a diagram for explaining the general configuration of a retail sales management system according to the embodiment.

FIG. 1 is a diagram for explaining the general configuration of a retail sales management system according to the embodiment. In this embodiment, the retail sales management system can be used to provide various products and services; however, to simplify the explanation, general goods and services are collectively described as products, and the retail sales of digital content, such as music, is especially employed as an example. Further, the Internet is employed as a communication network.

In FIG. 1, the retail sales management system for this embodiment is carried out by a product retail sales management server 10 for the retail sales of products across the Internet. The product retail sales management server 10 receives a request from a user terminal 30, a client, returns an input screen file as an interface, and accepts from the user terminal 30 the entry of data concerning the purchase of a product.

In FIG. 1, when the user terminal 30 issues a product information request (101) to the product retail sales management server 10, the product retail sales management server 10 returns, to the user terminal 30, an input screen file (102) in which is written information concerning the product for sale, and the user terminal 30 displays an input screen based on the input screen file (102) that is received from the product retail sales management server 10. On the input screen, information concerning the product for sale and the current retail price for the product are displayed.

Then, the user designates a desired product by referring to the input screen, enters necessary information, and uses the user terminal 30 to transmit a purchase determination command (103) to the product retail sales management server 10. Upon the receipt of the command, the product retail sales management server 10 returns, to the user terminal 30, a notification (104) confirming the reception of the purchase procedures.

The product purchase processing is the same as the electronic commerce processing used to purchase an ordinary product via the Internet. In this embodiment, it should be noted that, since the retail price of the product is dynamically set, when the product information is transmitted as the input screen file (102) the retail price of the product is defined as the current price. Therefore, when the product is to be purchased after a specific time has elapsed since product information was furnished, the processing for the provision of the latest retail price of the product can be added. That is, the user terminal 30 transmits a product purchase request (105) to the product retail sales management server 10, and receives from the product retail sales management server 10 the latest retail price (106). If a predetermined time has elapsed since the product retail sales management server 10 received the purchase determination command (103), the server 10, instead of accepting the purchase procedures, may return the latest retail price (106).

In this arrangement, the functions of the product retail sales management server 10 can be performed by a web server, and the input screen is prepared as a web page. Then, when at the user terminal 30 data is entered in the web page, the product purchase procedures are accepted.

Further, in this case, the user terminal 30 uses a web browser to display the web page.

Figure 2:
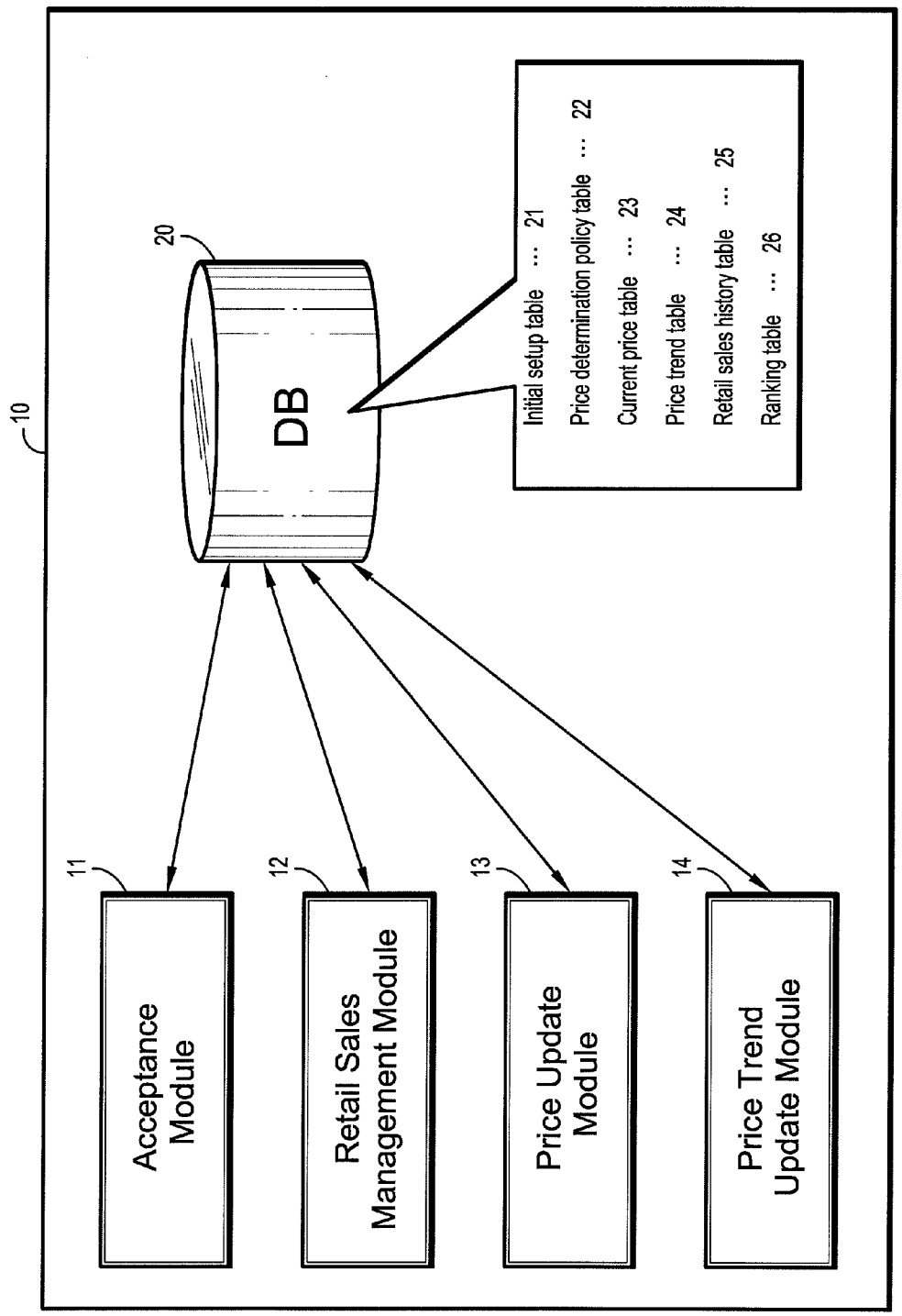
FIG. 2 is a diagram for explaining the structure of a product retail sales management server according to the embodiment.

FIG. 2 is a diagram for explaining the configuration of the product retail sales management server 10. In FIG. 2, an acceptance module 11 accepts a product information request (101) from the user terminal 30. A retail sales management module 12 manages the history of the retail sales of the product. A price update module 13 manages the retail price of the product. And a price trend update module 14 manages the trends associated with the changing of the retail price of the product.

A database 20 is used to manage the product and its sale, and an initial setup table 21, a price determination policy table 22, a current price table 23, a price trend table 24, a retail sales history table 25, and a ranking table 26 are stored in the database 20.

FIG. 3 is a diagram showing an example structure for the initial setup table 21.

Various information for determining the price of a product is stored in the initial setup table 21. In the example in FIG. 3, a product ID, a dependency element for determining the retail price, the lowest price, the highest price and the currency unit are stored in the initial setup table 21. The dependency element is used to determine the price of a product and a change in the price. The number of sales in FIG. 3 indicates that the price will be changed when a predetermined number of product sales have been recorded. That is, since digital content, such as music or video data, is downloaded once every time it is sold, the price is changed in accordance with the sales count. For a product or a service other than digital content, the price can be changed in accordance with the number of units that have been sold or the number of times the service has been provided. In addition to the sales count in FIG. 3, the dependency element can be the retail sale frequency, which indicates the number of retail sales (units) processed in a specific period of time, or a ranking based on an arbitrary concept, such as a retail sales ranking or a popularity ranking based on predetermined data. Since for the sale of music, there is a web site that provides rankings representative of the popularity of musical pieces, ranking information obtained by tying up with the site can be employed as the dependency element.

The lowest price and the highest price are set so that the price of the product will not fall below or rise above a specific value. When a certain product is especially popular and purchase requests are concentrated on that product, if the number of purchases is set as the dependency element, the price of the product will increase endlessly. However, when the price has increased until it is too high to be appropriate for the product, the number of purchase requests will fall, and this is not an acceptable condition for either the seller and the buyers. On the other hand, when the popularity of a specific product is low and the no trading history has been accumulated for it, a price whereat there is neither a loss nor a profit must be set based on the manufacturing cost of the pertinent product. Therefore, a reasonable price range should be determined for the product. However, these data are not requisite, and one or both of the lowest and the highest prices may not be set as desired by the seller.

Since the entry for the currency unit is set while taking into account the convenience it offers for trading, this is an arbitrary setting.

FIG. 4 is a diagram showing an example structure for the price determination policy table 22.

In the price determination policy table 22, the policy for determining the price of a product is set for a corresponding dependency element in the initial setup table 21. For example, when the number of retail sales is set as the dependency element in the initial setup table 21, a retail sales count dependency policy was set, such as "increase the price by 10 yen when there have been twenty sales of the product", or "reduce the price by 10 yen when there have been no sales of the product for 120 minutes". Similarly, when the ranking is set as the dependency element of the initial setup table 21, a ranking dependency policy is established, such as "increase the price by 10 yen when the rank is incremented by one", or "reduce the price by 10 yen when the rank is decremented by one". Further, when retail sales frequency is set as the dependency element for the initial setup table 21, a retail sales frequency dependency policy is entered, such as "increase the price by 10 yen when the retail sales frequency (the number of retail sales (units) handled in a predetermined period) is increased by 10%" or "reduce the price by 10 yen when the retail sales frequency is reduced by 20%". It should be noted that the parameters (the count, the ranking, the retail sales frequency, etc.) in the policy described above, and the unit for the price change (10 yen) can be arbitrarily established.

FIG. 5 is a diagram showing an example arrangement for the current price table 23.

The product ID and the current price of the product are stored in the current price table 23. In addition, the currency unit for the price is stored as needed, e.g., when a purchase request originating in a foreign country is accepted via the Internet.

FIG. 6 is a diagram showing an example structure for the price trend table 24.

A condition for a next price change is stored in the price trend table 24 consonant with the dependency element in the initial setup table 21. For example, the number of retail sales is set as the dependency element in the initial setup table 21, and a condition such as "increase the price of the product after five more sales (Rest_C 5)" or "last time the product was sold (Last Access_C)" is set as a parameter until the price is changed. Further, when the retail sales frequency is set as the dependency element in the initial setup table 21, a condition such as "increase the price of the product when it is sold five or more times a day (Freq_C 5)" is set as a parameter until the price is changed. In addition, the time condition can be set as a parameter, and a condition such as "maintain the current price until 12:59 in the afternoon (Next_T 12:59 PM)" can be designated. The numerical value for the count, the frequency and the time for each condition can be arbitrarily set.

FIG. 7 is a diagram showing an example arrangement for the retail sales history table 25.

The retail sales time and the price of the product at that time are stored in the retail sales history table 25. The total number of retail sales of the product is also managed in this table. And in addition, ID information for purchasers of the product may be stored in order to provide after sale service.

When the ranking information is set as the dependency element in the initial setup table 21, a rank (the retail sales count rank or popularity rank) corresponding to the dependency element is stored in the ranking table 26. In this embodiment, a site for obtaining the aggregate for the ranking may be provided for the product retail sales management server 10 that provides a product retail service, and unique ranking may be determined. Or, the information for ranking performed by another web site is obtained, depending on a product, and may be stored in the ranking table 26. When the product is music or video, the information is obtained from the site established to provide rankings for the popularity of music pieces or films, so that the price of the product can be set based on more general ranking information.

The operations of the individual modules will now be described. First, the operation of the acceptance module 11 will be explained.

Figure 8:
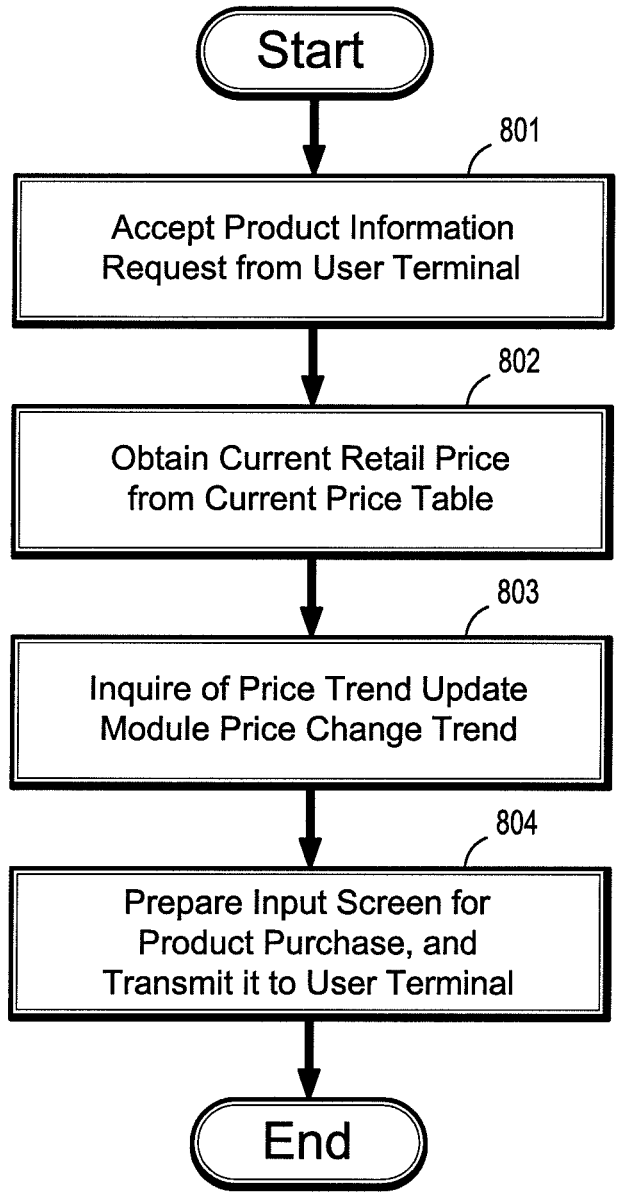
FIG. 8 is a flowchart for explaining the operation of an acceptance module according to the embodiment.

FIG. 8 is a flowchart for explaining the processing performed by the acceptance module 11 in FIG. 2.

When the acceptance module 11 receives a product information request (see 101 in FIG. 1) from the user terminal 30 (step 801), the acceptance module 11 examines the current price table 23 to obtain the current retail price of the requested product (step 802). Then, the acceptance module 11 inquires of the price trend update module 14 the trends associated with the changing of the price of the product (step 803). The acceptance module 11 prepares the input screen for the purchase of the product in accordance with the current retail price obtained at step 802 and the information concerning the price change trends received from the price trend update module 14 at step 803. And the file for the input screen (see 102 in FIG. 1) is transmitted to the user terminal 30 (step 804). A detailed description of the input screen will be given later.

During this processing, the acceptance module 11 examines the price trend table 24 to directly obtain information concerning the price change trends, but also inquires of the price trend update module 14 the trends associated with the changing of the price. This is done because since the information for the trends associated with the changing of the product price varies in accordance with the retail sales state of the product and the elapsed time, the user terminal 30 should be provided the latest information.

When the user terminal 30 receives the data file for the input screen, it then displays the input screen. Thereafter, to purchase a desired product, a user enters data on the input screen displayed by the user terminal 30, and uses the user terminal 30 to transmits a purchase determination command (see 103 in FIG. 1). At this time, since at the least, a specific time will have elapsed between the time the input screen file was received and the time the purchase determination command was issued, the retail price of the product may have changed since the input screen file was received. In this case, when the product retail sales management server 10 accepts the purchase determination command (corresponding to step 801), before finally accepting the purchase request, the server 10 may perform the processes at steps 802 to 804 and transmit the latest retail price to the user terminal 30 (see 106 in FIG. 1).

A script may also be displayed in the input screen file transmitted to the user terminal 30 in order to request the periodic transmission of the latest price and the price change trends, so that for updating, the price and the price change trends are periodically transmitted by the product retail sales management server 10.

The processing performed by the retail sales management module 12 will now be described.

Figure 9:
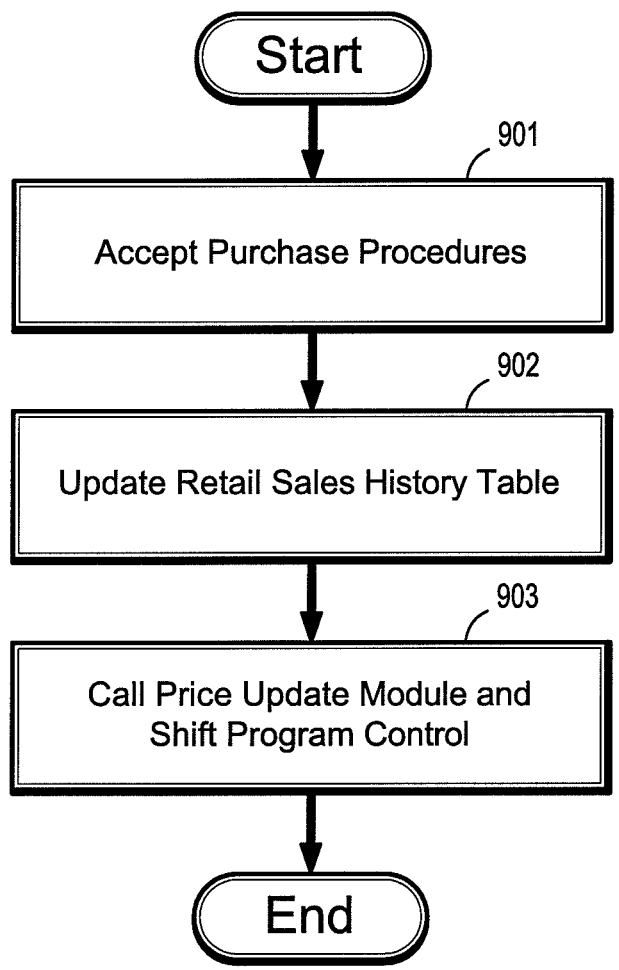
FIG. 9 is a flowchart for explaining the operation of a retail sales management module according to the embodiment.

FIG. 9 is a flowchart for explaining the processing performed by the retail sales management module 12.

The retail sales management module 12 monitors the operation of the acceptance module 11. When the retail sales management module 12 detects the receipt by the acceptance module 11 of the product purchase determination command and the acceptance of the purchase procedures (step 901), the retail sales management module 12 updates the retail sales history table 25 (step 902). Then, in order to determine whether the price should be changed for this retail sale, the retail sales management module 12 calls up the price update module 13 and shifts the program control to it. Thereafter, the processing is terminated (step 903).

The operation of the price update module 13 will now be described.

The price update module 13 operates periodically, or in accordance with a call by the retail sales management module 12, and updates the current price table 23.

Figure 10:
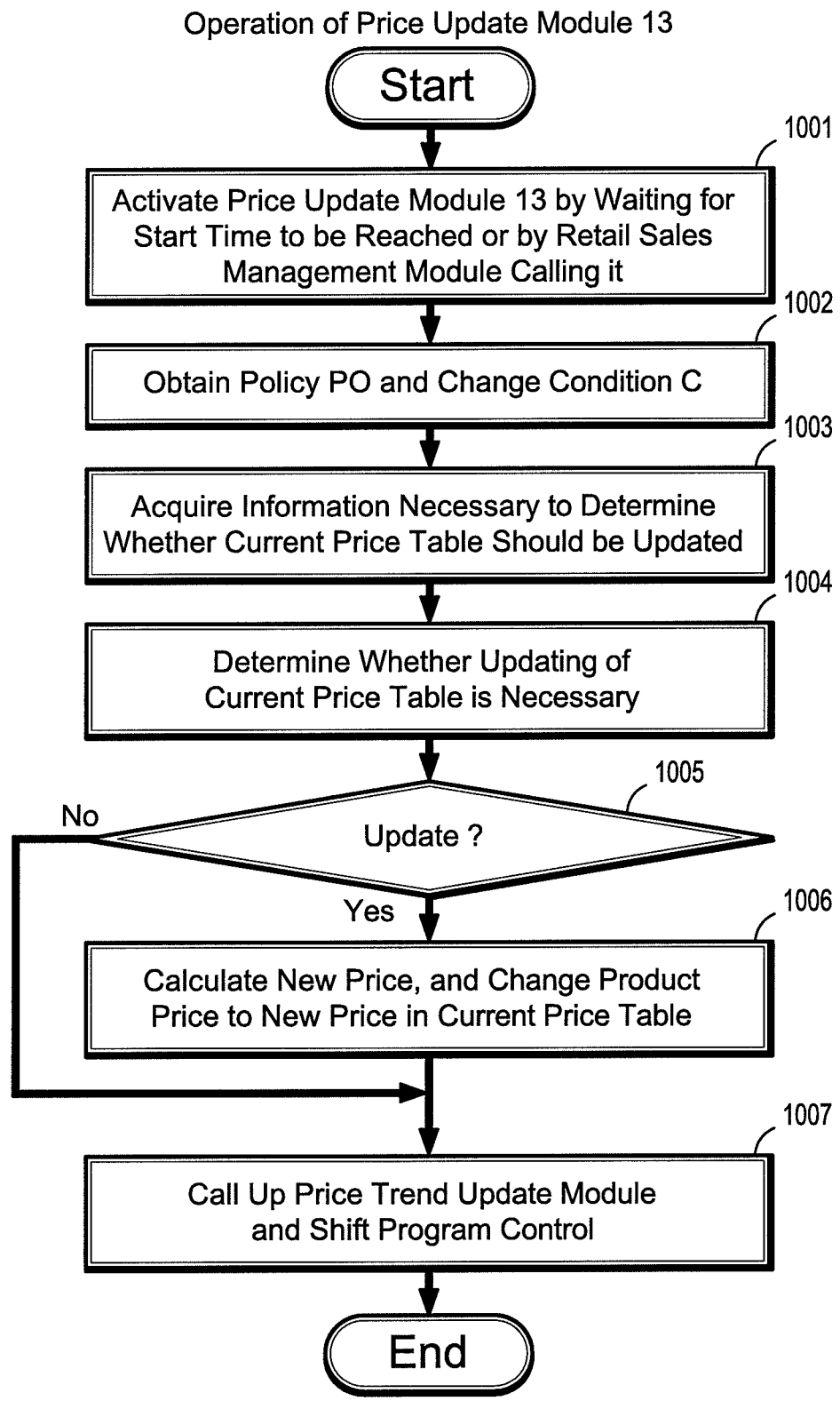
FIG. 10 is a flowchart for explaining the operation of a price update module according to the embodiment.

FIG. 10 is a flowchart for explaining the processing performed by the price update module 13.

The price update module 13 is activated when it is called up by the retail sales management module 12, or when a predetermined start time is reached (step 1001). Then, a policy PO is obtained from the price determination policy table 22, and a change condition C, which is effective until the retail price of the product is changed, is acquired from the price trend table 24 (step 1002). The information required to determine whether the current price table 23 must be updated is also acquired in accordance with the policy PO and the change condition C (step 1003). The information required for the determination differs, depending on the definition of the policy PO.

When the policy PO for changing the price in accordance with the number of units sold is defined, information concerning the number of product units sold must be obtained from the retail sales history table 25 in order to ascertain how many units have been sold. Further, when the policy PO according to which the price is changed as time elapses is defined, the current time must be obtained from the system.

In this manner, required information is acquired in accordance with the contents of the policy PO. When all information that it seems may be used for the determination has been acquired, only necessary information is employed in accordance with the contents of the policy PO.

Then, the obtained information and the policy PO are employed to determine whether the current price table 23 should be updated (step 1004). Then, when the policy PO definition is that the price must be changed in accordance with the number of retail sales unit, and the number of retail sales unit at which the price must be changed is reached, it is ascertained that the current price table 23 must be updated.

When it is ascertained that an update of the current price table 23 is necessary, thereafter, a new price based on the policy PO is calculated, and the price of the product in the current price table 23 is updated (steps 1005 and 1006).

When the current price table 23 has been updated in this manner, or when an update is not required, the price trend update module 14 is called up and program control is shifted thereto. The processing is thereafter terminated (step 1007). When the current price table 23 is updated and the price of the product is changed, the price trend table 24 must be changed in accordance with the new price. Even if the current price table 23 need not be updated, a condition that is effective until the price has been changed may be altered when the product has been sold or when a predetermined time has elapsed. Therefore, the price trend update module 14 determines whether the condition is changed, and if necessary, updates the price trend table 24.

The operation of the price trend update module 14 will now be described.

Figure 11:
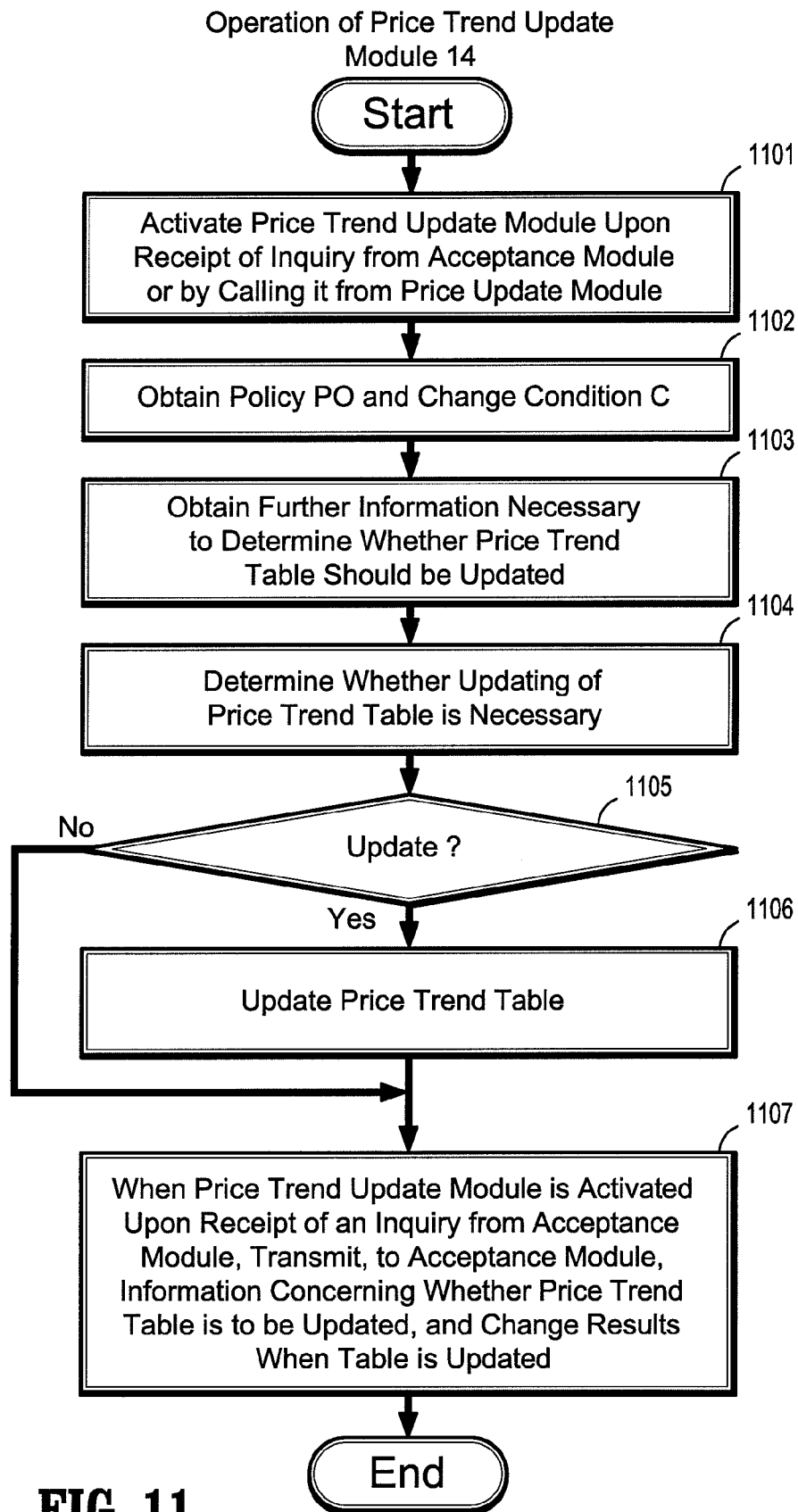
FIG. 11 is a flowchart for explaining the operation of a price trend update module according to the embodiment.

FIG. 11 is a flowchart for explaining the processing performed by the price trend update module 14.

The price trend update module 14 is activated upon the receipt of the inquiry from the acceptance module 11 (see step 803 in FIG. 8) or in accordance with the call issued by the price update module 13 (see step 1007 in FIG. 10) (step 1101). Then, the price trend update module 14 obtains, from the price determination policy table 22, the policy PO for determining the retail price of the product, and acquires from the price trend table 24 the change condition C that is effective until the retail price of the product is changed (step 1102).

In accordance with the policy PO and the change condition C, the price trend update module 14 also obtains the information needed to determine whether the price trend table 24 should be updated (step 1103). The information required for the determination differs, depending on the definition provided by the policy PO.

When the policy PO for changing the price in accordance with the number of retail sale units is defined, the condition "change the price after several more units have been sold" is changed each time the product is sold. Therefore, information concerning the number of retail sales units must be acquired from the retail sales history table 25. Further, when the policy PO as defined is for the changing of the price as time elapses, the condition "change the price several minutes (or several hours or several days) from now", or the condition "change the price at a specific hour (or on a specific date)" is changed to reflect each predetermined time. Therefore, the time information must be obtained from the system.

In this manner, required information is acquired in accordance with the contents of the policy PO. Further, all the information that it seems may be used for the determination may be obtained, but only necessary information may be employed in consonance with the contents of the policy PO.

The obtained information is employed to determine whether the updating of the price trend table 24 is required (step 1104). That is, a check is performed to determine whether the information obtained at step 1102 satisfies the change condition C obtained from the price trend table 24. When the information does not satisfy the condition, e.g., if the policy PO for changing the price in accordance with the number of retail sales units is defined and the number of retail sales units is 0, the processing is terminated without updating the price trend table 24 (step 1105).

When the information obtained at step 1102 satisfies the change condition C acquired from the price trend table 24, e.g., when the policy PO establishes that a price in accordance with the number of units purchased and when the number of purchases is equal to or greater than one, the price trend table 24 is updated in accordance with the policy PO (steps 1105 and 1106).

When the price trend update module 14 is activated upon the receipt of the inquiry from the acceptance module 11, the price trend update module 14 transmits, to the acceptance module 11, a response stating whether the price trend table 24 has been changed and including the results obtained by changing the price trend table 24 (step 1107).

As is described above, since the price trend update module 14 is operated in the same way as is the price update module 13, and is also activated when the acceptance module 11 has received a request for product information, the latest information can always be stored in the price trend table 24.

In this embodiment, the price trend update module 14 has been activated not only upon the receipt of the inquiry from the acceptance module 11, but also by being called by the price update module 13. However, the price trend update module 14 may be operated separately from the price update module 13. For example, when the policy for changing the price of the product as time elapses is defined in the price determination policy table 22, information concerning the trend associated with the changing of the price is varied, as needed.

Therefore, it is preferable that, in order to update the price trend table 24, the price trend update module 14 be operated more frequently than the price update module 13.

Figure 12:
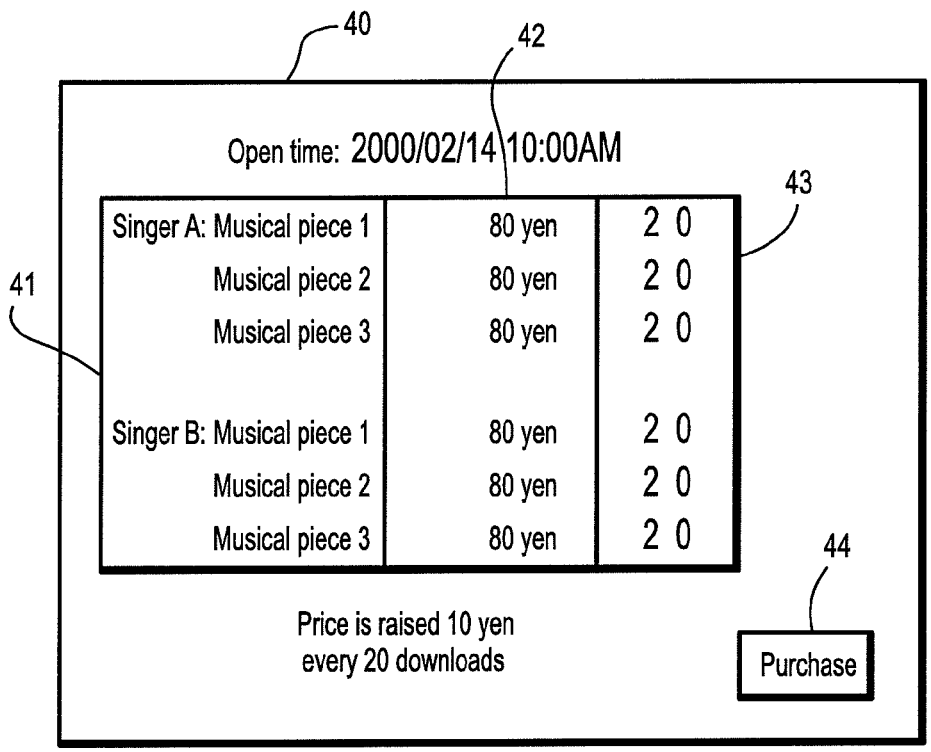
FIG. 12 is a diagram showing an example input screen used for the embodiment.

FIG. 12 is a diagram showing an example input screen displayed by the user terminal 30. In an input screen 40, music provided as digital content is defined as a product, and the price is to be changed in accordance with the number of purchases (the number of downloads).

As is described above, when a product information request is issued by the user terminal 30 to the product retail sales management server 10, the acceptance module 11 of the product retail sales management server 10 prepares the input screen 40, and transmits the file for the input screen 40 to the user terminal 30. The user terminal 30 then uses a browser to display the input screen 40, and waits for the input of data by a user.

In FIG. 12, the input screen 40 includes a product information display column 41, for displaying information concerning a product, a price display column 42, for displaying the price of the product, a price trend display column 43, for indicating the trend associated with the changing of the price, and a purchase button 44, for transmitting a purchase determination command. In the example in FIG. 12, music pieces 1 to 3, recorded by a singer A, and music pieces 1 to 3, recorded by a singer B, are displayed as product information and are presented in the product information display column 41, while the prices of the individual music pieces are displayed in the price display column 42. Further, the number of purchases (the number of downloads) remaining until the product price is next raised is displayed in the price trend display column 43. This value, together with a message at the bottom of the input screen 40, "raise the price 10 yen every 20 downloads", represents the price change trend. That is, the user understands that when the number of product information downloads equals the number displayed in the price trend display column 43, the download count will reach 20 and the price of the product will be raised 10 yen.

When the user selects a desired music piece (a product) on the input screen 40 and clicks on the purchase button 44, the purchase determination command is transmitted to the product retail sales management server 10. Further, if needed, when the purchase button 44 is clicked on, a purchase procedures screen may be displayed and the user requested to enter his or her name and address and to select a payment method. When a predetermined time has elapsed between the time the input screen 40 was displayed and the purchase button 44 was clicked on, instead of the transmission of the purchase determination command, a message may be displayed requesting the provision of the latest information for the price and the price change trends, and the data on the input screen 40 may be updated.

Figure 13:
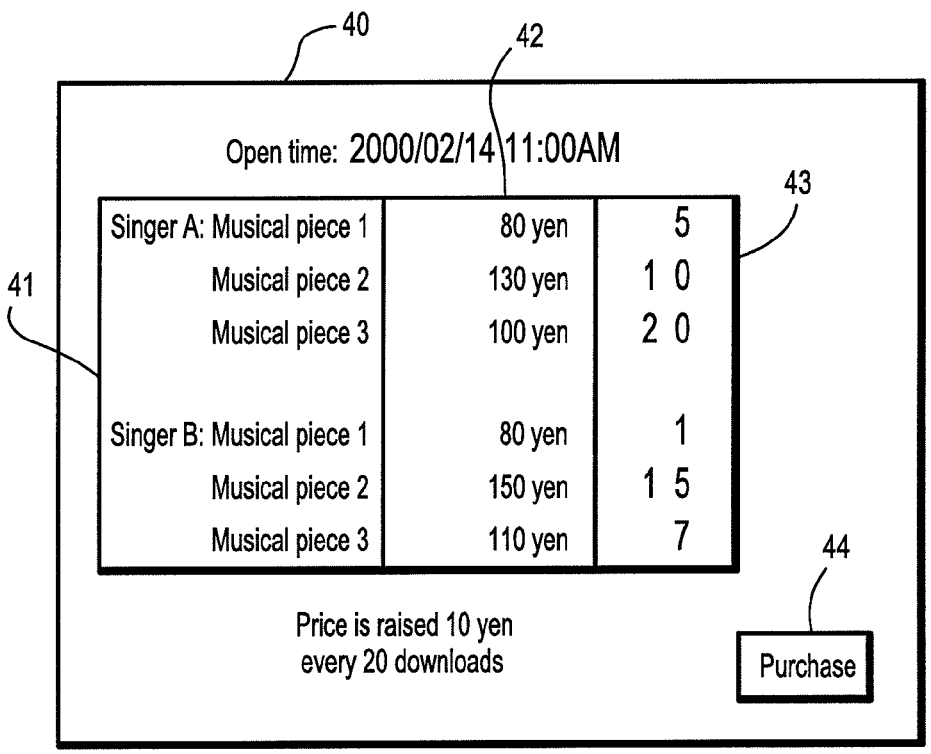
FIG. 13 is a diagram showing the state of the input screen after a predetermined time has elapsed since the state shown in FIG. 12.

FIG. 13 is a diagram showing the state of the input screen 40 when a predetermined time has elapsed since the state shown in FIG. 12 was acquired.

In FIG. 13, the prices for the individual music pieces and the price change trends (information indicating the remaining download count before the price is raised) are changed. For example, it is apparent that music piece 1, recorded by singer A, has been downloaded 15 times, and that the price will be raised after another five downloads. Similarly, it is apparent that after the price of the music piece 2, recorded by singer A was raised five times (the music piece 2 was downloaded 100 (=20 5) times), the music piece 2 was downloaded ten more times, and its price will be raised to 140 yen after another ten downloads. In this manner, more profits can be obtained with a popular, good selling product by raising its price, and a competitive price can be provided for a poor selling product by reducing its price.

The input screen 40 shown in FIGS. 12 and 13 is merely an example, and so long as the same data entry is available, the structure is not limited to the one shown. For example, the purchase button 44 may not be provided and the screen may be shifted to a purchase procedure screen by clicking on a desired music piece. Or, a script may be written in the input screen file, so that the price of the product or the price change trends can be automatically updated.

The information presented in the product information display column 41 should also be appropriately displayed in accordance with the kind of product. For example, if the product is not digital content but an article, an image of the article or an introductory statement for the article may be provided.

Figure 14:
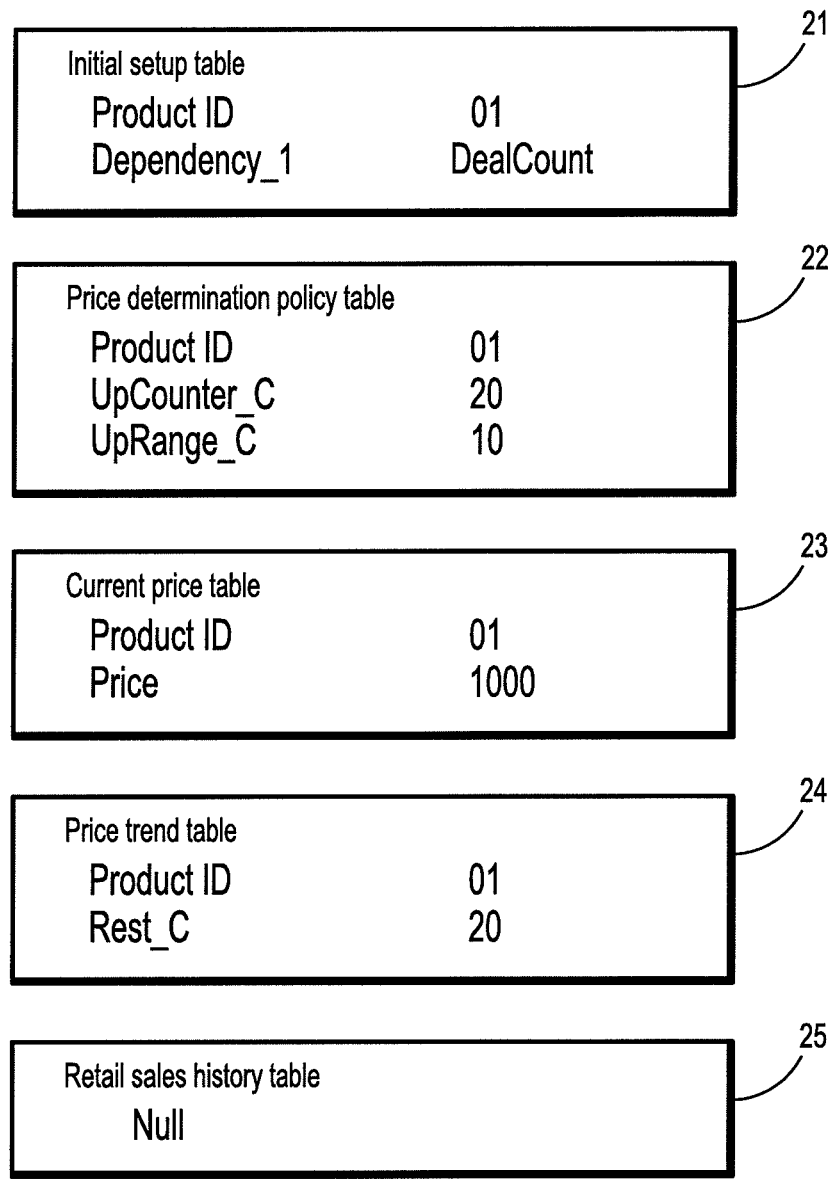
FIG. 14 is a diagram showing the initial states of the respective tables for an example operation according to the embodiment.

A specific operation performed for this embodiment will now be described. FIG. 14 is a diagram showing the initial state of each table prepared for a predetermined product. Since the price of a product is changed without depending on the rankings, the ranking table 26 is not present. It should be noted that in FIG. 14 the formats shown in FIGS. 3 to 7 are not employed for the respective tables and that only brief listings of the contents are displayed.

In FIG. 14, in the initial setup table 21, the number of units (Deal Count) of the product (Product ID 01) purchased is set as the dependency element (Dependency_1). In the price determination policy table 22, the number of units (Up counter_C) that must be purchased to raise the price is set at 20, and the price rise range (Up Range_C) is set at 10 yen. In the current price table 23, the initial value of the retail price (Price) is set at 1000 yen. In the price trend table 24, the number of remaining units that must be purchased before the price rise (Rest_C) is initially set to 20. The retail sales history table 25 is set to Null because the sale of the product has not yet begun.

Assume that one purchaser bought one product (Product ID 01) at predetermined time (11:00). FIG. 15 is a diagram showing a table wherein the contents are changed by this purchase.

In FIG. 15, the retail sales history table 25 records 11:00 (written as T(11:00)) as the purchase time (Purchase Time) of the product (Product ID 01), and records 1000 yen as the purchase price (Purchase Price). Accordingly, as is shown in FIG. 10, the price update module 13 is operated and whether the current price table 23 must be updated is determined. In this example, since the number of units (Up Counter_C) required to raise the price in the price determination policy table 22 is set at 20, and the number of remaining units (Rest_C) before the price is raised in the price trend table 24 is set at 20, no price change is performed.

The price trend update module 14 is operated and whether the price trend table 24 must be updated is determined. But since one product (Product ID 01) unit has been purchased, the price trend table 24 is updated, and the number of units remaining before the price is raised is decremented by one, to 19.

Assume that a predetermined time has elapsed (11:30) and the total number of purchased product (Product ID 01) units has reached 20. FIG. 16 is a diagram showing a table in which the contents are accordingly changed.

In FIG. 16, the retail sales history table 25 records 11:30 (written as T(11:30)) as the purchase time (Purchase Time) of the product (Product ID 01), and records 1000 yen as the purchase price (Purchase Price). Accordingly, as is shown in FIG. 10, the price update module 13 is operated and whether the current price table 23 must be updated is determined. In this example, since the number of units purchased reaches 20, that is the number of units (Up Counter_C) required to raise the price in the price determination policy table 22, and the number of remaining units (Rest_C) before the price is raised in the price trend table 24 is reduced to 0. Thus, the current price table 23 is updated and the retail price of the product (Product ID 01) is changed. Since the range (Up Range_C) of the price rise in the Price determination policy table 22 is 10 yen, the retail price (Price) in the current price table 23 is increased 10 yen to 1010 yen. Therefore, the product (Product ID 01) is thereinafter purchased at 1010 yen.

The price trend update module 14 is operated and whether the price trend table 24 need be updated is determined. In this example, the price trend table 24 is also updated based on the updating of the current price table 23. Specifically, since this occurs immediately after the current price table 23 is updated by the price update module 13 and the new retail price is obtained, the number of units (Up Counter_C) required to increase the price in the price determination policy table 22 is again set to 20.

Another example operation for this embodiment will now be described.

Figure 17:
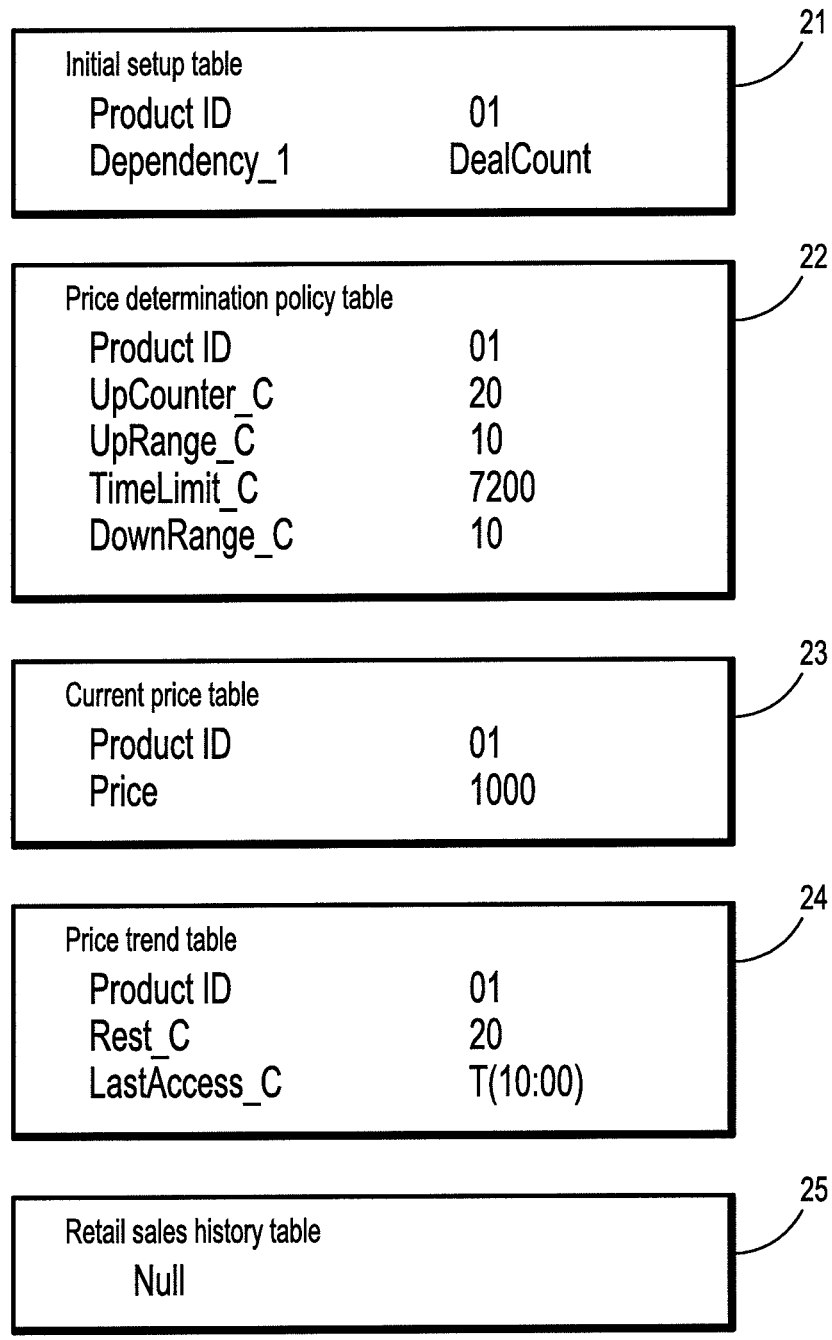
FIG. 17 is a diagram showing the initial states of the respective tables for another example operation according to the embodiment.

FIG. 17 is a diagram showing the initial states of the tables concerning a predetermined product. In this example, since the price of the product is changed without depending on its rank, the ranking table 26 is not present. It should be noted that in FIG. 14 the formats shown in FIG. 3 to 7 are not employed for the respective tables and the only brief listings of the contents displayed.

In this example, the price update module 13 and the price trend update module 14 are activated every ten minutes to determine whether the current price table 23 and the price trend table 24 must be updated.

In FIG. 17, in the initial setup table 21, the number of units (Deal Count) of the product (Product ID 01) that are purchased is set as the dependency element (Dependency_1). In the price determination policy table 22, the number of units (Up counter_C) that must be purchased to raise the price is set at 20, and the price rise range (Up Range_C) is set at 10 yen. Further, in this example, when there have been no product (Product ID 01) purchases for a predetermined period of time, the retail price of the product is reduced. Thus, in the price determination policy 22, the time defined as the price reduction condition (Time Limit_C) is 7200 seconds, and the range of a price reduction (Down Range_C) is set at 10 yen.

In the current price table 23, the initial value of the retail price (Price) is set at 1000 yen. In the price trend table 24, the number of units remaining to be purchased before a price rise (Rest_C) is initially set to 20. The last access time (Last Access_C), i.e., the time whereat the count is initially began, is set at 10:00 (written as T(10:00)). And the retail sales history table 25 is set to Null because the sale of the product is not yet begun.

After 10:00, the product retail sales management server 10 activates the price update module 13 and the price trend update module 14 every 10 minutes to permit them to determine whether the updating of the tables is necessary. However, because in each case the time elapsed since the price trend table 24 was last accessed (Last Access_C) is less than 7200 seconds, which is the price reduction condition in the price determination policy table 22, neither the current price table 23 nor the price trend table 24 are updated.

Assume that one purchaser bought one product (Product ID 01) at a predetermined time (11:00). FIG. 18 is a diagram showing tables wherein the contents are changed by this purchase.

In FIG. 18, the retail sales history table 25 records 11:00 (written as T(11:00)) as the purchase time (Purchase Time) of the product (Product ID 01), and records 1000 yen as the purchase price (Purchase Price). Accordingly, the price update module 13 is operated and whether the current price table 23 must be updated is determined. In this example, since the number of units (Up Counter_C) required to raise the price in the price determination policy table 22 is set at 20, and the number of remaining units (Rest_C) before the price will be raised in the price trend table 24 is set at 20, no price change is performed.

Thereafter the price trend update module 14 is operated and whether the price trend table 24 must be updated is determined. Since one product (Product ID 01) unit has been purchased, the price trend table 24 is updated, and the number of units remaining before the price is raised is decremented by one, to 19, and 11:00 (T(11:00)) is set as the last access time (Last Access_C).

Assume that thereafter the product (Product ID 01) is not purchased for 7200 seconds (two hours). Then, (T(Current Time)−Last Access_C) (Time Limit_C) is established, and thus, the price update module 13 and the price trend update module 14 update the current price table 23 and the price trend table 24. FIG. 19 is a diagram showing the tables after the contents have been accordingly changed.

In FIG. 19, first, since the range (Down Range_C) of the price reduction in the price determination policy table 22 is 10 yen, the retail price (Price) in the current price table 23 is reduced by 10 yen to 990 yen. Thus, the product (Product ID 01) can thereafter be purchased at 990 yen.

Since the current price table 23 has just been updated by the price update module 13 and a new retail price has just been obtained, the price trend update module 14 again set to 20, the number of units (Up Counter_C) that are required to be purchased for the price in the price determination policy table 22 to be raised. Further, in order to count the time again, the last access time (LastAccess_C) is set to the current time (written as T(Current Time)), i.e., 13:00.

As is described above, the retail price of the product can be dynamically changed in accordance with the retail sales state of the product, and an appropriate retail price can be set in accordance with the reaction of the market.

As is described above, according to the present invention, a retail sales management system can be provided that dynamically sets the retail price for a product or a service in accordance with the popularity or an evaluation of the product or the service.

A legend for the symbols is repeated herein for convenience:

10: Product retail sales management server
11: Acceptance module
12: Retail sales management module
13: Price update module
14: Price trend update module
20: Database
21: Initial setup table
22: Price determination policy table
23: Current price table
24: Price trend table
25: Retail sales history table
26: Ranking table
30: User terminal
40: Input screen Having described embodiments of the invention it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims.

What is claimed is:

1. A method for managing product retail sales, comprising:
    receiving an information request regarding a product from a current user;
    retrieving a dependency element, a policy, and a change condition from a database at a server, wherein the policy corresponds to the dependency element and defines a rule for changing a price of the product, and the change condition indicates an event relating to the rule that will trigger changing the price;
    maintaining current and historical retail sales data regarding the product in a memory;
    generating trend information based on the current and historical retail sales data;
    updating, dynamically by a processor, the price based on the dependency element, the policy, the change condition, and the trend information, wherein the price is maintained within a predetermined price range, and the price is updated based on total sales of the product independently from information corresponding to the current user's identity; and
    displaying, at a client, the dynamically-updated price and the change condition in response to the information request, wherein the server and the client communicate with each other via a communication network.

2. The method of claim 1, further comprising:
    receiving an initial purchase request for the product at the server from the client after the dynamically-updated price and the change condition have been displayed, wherein the initial purchase request is accepted by the server upon being received before a predetermined time has elapsed, and the initial purchase request is rejected and a new dynamically-updated price of the product is displayed at the client upon the initial purchase request being received after the predetermined time has elapsed; and
    receiving a subsequent purchase request based on the updated current value of the price from the client after the initial purchase request has been rejected.

3. The method of claim 2, further comprising:
    displaying, periodically at the client, the new dynamically-updated price prior to receiving the purchase request.

4. The method of claim 1, wherein the sales characteristic is a retail sales count.

5. The method of claim 4, wherein the rule defined by the policy causes the price to be increased by a first predetermined amount upon determining that a first certain number of sales have occurred in a first specific period of time, and the price to be decreased by a second predetermined amount upon determining that a second certain number of sales have not occurred in a second specific period of time.

6. The method of claim 1, wherein the sales characteristic is a retail sale frequency indicating that a number of retail sales has been processed in a specific period of time.

7. The method of claim 6, wherein the rule defined by the policy causes the price to be increased by a first predetermined amount upon determining that a first certain number of sales occurring in a first specific time period has increased by a first certain percentage, and the price to be decreased by a second predetermined amount upon determining that a second certain number of sales occurring in a second specific time period has decreased by a second certain percentage.

8. The method of claim 1, wherein the sales characteristic is a product ranking, and the product ranking is obtained from a product ranking database different from the database disposed at the server, and comprising a collection of product rankings for a plurality of products.

9. The method of claim 8, wherein the ranking is one of a retail sales ranking and a popularity ranking.

10. The method of claim 9, wherein rule defined by the policy causes the price to be increased by a first predetermined amount upon determining that the ranking has been incremented by a first certain number, and the price to be decreased by a second predetermined amount upon determining that the ranking has been decremented by a second certain number.

11. The method of claim 1, wherein the change condition displayed at the client indicates a remaining number of purchases of the product until the price is increased.

12. The method of claim 1, wherein the change condition displayed at the client indicates an amount and time that the price will be reduced, wherein the amount and the time that the current value of the price will be reduced is based on the total sales of the product.

13. The method of claim 1, wherein the change condition displayed at the client indicates an amount the price will be increased upon a rank of the product being incremented by a certain number.

14. The method of claim 1, wherein the change condition displayed at the client indicates an amount the price will be reduced upon a rank of the product being decremented by a certain number.

* * * * *